United States Patent [19]

Simons

[11] Patent Number: 4,991,936
[45] Date of Patent: Feb. 12, 1991

[54] THERMALLY-TRANSFERRED COLOR FILTER ARRAY ELEMENT

[75] Inventor: Michael J. Simons, Ruislip, Great Britain

[73] Assignee: Eastman Kodak Company, Rochester, N.Y.

[21] Appl. No.: 408,340

[22] Filed: Sep. 18, 1989

[30] Foreign Application Priority Data

Oct. 18, 1988 [GB] United Kingdom ............... 8824362
May 31, 1989 [GB] United Kingdom ............... 8912487

[51] Int. Cl.$^5$ ................ G02B 5/22; B41M 5/20
[52] U.S. Cl. ........................ 350/317; 350/311; 350/320; 250/226; 503/227; 346/76 PH; 430/7; 430/201; 8/467
[58] Field of Search ............ 350/317, 311, 321, 320; 250/226; 8/467, 471, 478; 428/49, 143; 430/7, 24, 200, 201; 346/76 PH; 503/227

[56] References Cited

U.S. PATENT DOCUMENTS

| 4,081,277 | 3/1978 | Brault et al. | 250/226 |
|---|---|---|---|
| 4,267,961 | 5/1981 | Martin et al. | 350/317 |
| 4,594,307 | 6/1986 | Ishida | 430/201 |
| 4,621,271 | 11/1986 | Brownstein | 346/76 PH |
| 4,772,582 | 9/1988 | DeBoer | 430/201 |
| 4,776,671 | 10/1988 | Sumi et al. | 350/311 |

FOREIGN PATENT DOCUMENTS 61-072203 4/1986 Japan.

Primary Examiner—Bruce Y. Arnold
Assistant Examiner—Loha Ben
Attorney, Agent, or Firm—Harold E. Cole

[57] ABSTRACT

A thermally-transferred color filter array element comprising a transparent support having thereon a thermally-transferred image comprising a repeating mosaic pattern of colorants in a cross-linked polymeric binder having a $T_g$ greater than 150° C., the binder being cross-linked after transfer of the image.

9 Claims, No Drawings

THERMALLY-TRANSFERRED COLOR FILTER ARRAY ELEMENT

This invention relates to a thermally-transferred color filter array element which is used in various applications such as a liquid crystal display device.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face to face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving phototube display, mounted electronic display, or TV-image display. Various attempts have been made to incorporate a color display using a color filter array element into these devices. However, none of the color array elements for liquid crystal display devices so far proposed have been successful in meeting all the users needs.

One commercially-available type of color filter array element which has been used in liquid crystal display devices for color display capability is a transparent support having a gelatin layer thereon which contains dyes having the additive primary colors red, green and blue in a mosaic pattern obtained by using a photolithographic technique. To prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor-intensive steps, requires careful alignment, is time-consuming and very costly. Further details of this process are disclosed in U.S. Pat. No. 4,081,277.

In addition, a color filter array element to be used in a liquid crystal display device may have to undergo rather severe heating and treatment steps during manufacture. For example, a transparent electrode layer, such as indium tin oxide, is usually vacuum sputtered onto the color filter array element. This may take place at temperatures elevated as high as 200° C. for times which may be one hour or more. This is followed by coating with a thin alignment layer for the liquid crystals, such as a polyimide. Regardless of the alignment layer used, the surface finish of this layer in contact with the liquid crystals is very important and may require rubbing or may require curing for several hours at an elevated temperature. These treatment steps can be very harmful to many color filter array elements, especially those with a gelatin matrix.

Another method of obtaining a color filter array element for a liquid crystal display device is described in EPA 246,334. This method employs a porous membrane to contain the dyes which are transferred by heat under reduced pressure using a metal mask. There is a problem in that technique in obtaining sufficient sharpness of the image since the dyes have to transfer from the donor layer to the receiver layer through the air gap formed by the thickness of the metal mask.

Another method of obtaining a color filter array element for a liquid crystal display device is described in JP 61/072203. This reference discloses making a color filter array element by the use of a conductive fine powder in the dye-receiving layer and a mixed conductive fine powder of a flaky powder and a spherical powder in the dye-donor layer of a thermal dye transfer unit. There is a problem with using such a filter array element in a liquid crystal display device, however, in that the dyes of the filter array element itself are in direct contact with the liquid crystal material. The dyes in such a device would tend to mix with the liquid crystal material causing a loss of color in the viewed image.

It would be desirable to provide a high quality color filter array element having good sharpness and which can be obtained easily and at a lower price than those of the prior art. It would also be desirable to provide such a color filter array element which will be able to withstand the heating and treatment steps employed in making a liquid crystal display device.

These and other objects are achieved in accordance with this invention which comprises a thermally-transferred color filter array element comprising a transparent support having thereon a thermally-transferred image comprising a repeating mosaic pattern of colorants in a cross-linked polymeric binder having a glass transition temperature ($T_g$) greater than 150° C., the binder being cross-linked after transfer of the image.

In a preferred embodiment of the invention, the mosaic pattern consists of a set of red, green and blue additive primaries.

In another preferred embodiment of the invention, each area of primary color and each set of primary colors are separated from each other by an opaque area, e.g. black grid lines. This has been found to give improved color reproduction and reduce flare in the displayed image.

The size of the mosaic set is not critical since it depends on the viewing distance. In general, the individual pixels (mosaic elements) of the set are from about 50 to about 600 μm. They do not have to be of the same size.

In a preferred embodiment of the invention, the repeating mosaic pattern of dye to form the color filter array element consists of uniform, square, linear repeating areas, with one color diagonal displacement as follows:

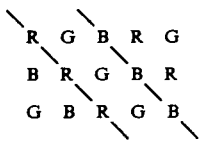

In another preferred embodiment, the above squares are approximately 100 μm.

As noted above, the color filter array elements of the invention are used in various display devices such as a liquid crystal display device. Such liquid crystal display devices are described, for example, in UK Pat. Nos. 2,154,355., 2,130,781; 2,162,674 and 2,161,971.

The polymeric binder employed in the invention may comprise, for example, a polycarbonate, a polyurethane, a polyester, a polyamide, a polyacrylonitrile, or mixtures or copolymers thereof, provided it is cross-linkable as described above. The polymeric binder may be present in any amount which is effective for the intended purpose. In general, good results have been obtained at a concentration of from about 0.25 to about 5 g/m².

A cross-linked binder which has a $T_g$ greater than 150° C. better enables the color filter array element to be resistant to the rather severe heating and treatment steps which are necessary in forming a liquid crystal display device. Examples of such cross-linkable polymeric binders include polymers which may be cross-linked by reaction with another substance present in or applied to the layer, such as epoxy resins (reacting with, for example, bifunctional amine compounds or resins, butylated urea, melamine or benzo-guanamine resins or phenolic adducts), unsaturated polyesters (reacting with, for example, organic peroxides), phenolic resins (reacting with, for example, aldehydes), alkyd resins (reacting with, for example, butylated urea, melamine or benzo-guanamine resins) or polyurethanes (reacting with, for example, di-isocyanates); and polymer systems which may be cross-linked on exposure to light, in the presence of photoinitiators or photosensitizers. Several examples of the latter class are described in "Photopolymerization of Surface Coatings" by C. G. Roffey, published by John Wiley and Sons, Chichester, England, 1982, and include as polymers, unsaturated polyesters and polyamides, polyvinyl acetals, polymers with cinnamoyl groups, epoxy resins and polyurethanes, and as photosensitizers, aromatic carbonyl compounds such as benzoin, acetophenones, benzophenones and quinones, and also aryl diazonium compounds and metal carbonyls. A valuable class of photocrosslinkable polymeric materials is described by Purbrick and Wagner in British Patent No. 2,106,522B, and comprises a polymer bearing nucleophilic groups, such as epoxy, carbonyl, hydroxy, tertiary amino, morpholino, unsaturated nitrogen-containing heterocyclic, or mercapto groups, and radiation-sensitive metal carbonyl compounds, such as benzene chromium tricarbonyl.

The transparent support for the color filter array element may be any transparent material such as polycarbonate, polyethylene terephthalate, cellulose acetate, polystyrene, etc. In a preferred embodiment the support is glass.

A dye-donor element that is used to form the color filter array element of the invention comprises a support having thereon a dye layer. Any dye or mixture of dyes can be used in such a layer provided they are transferable to the dye image-receiving layer of the color array element of the invention by the action of heat. Especially good results have or any of the dyes disclosed in U.S. Pat. No. 4,541,830, the disclosure of which is hereby incorporated by reference. The above subtractive dyes may be employed in various combinations to obtain the desired red, blue and green additive primary colors. The dyes may be mixed within the dye layer or transferred sequentially if coated in separate dye layers. The dyes may be used at a coverage of from about 0.05 to about 1 g/m².

The dye in the dye-donor element is preferably dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m².

The dye layer of the dye-donor element may be coated on the support or printed thereon by a printing technique such as a gravure process.

Any material can be used as the support for the dye-donor element provided it is dimensionally stable and can withstand the heat of the thermal printing process. Such materials include polyesters such as poly(ethylene terephthalate); polyamides; polycarbonates; glassine paper; condenser paper; cellulose esters; fluorine polymers; polyethers; polyacetals; polyolefins; and polyimides. The support generally has a thickness of from about 2 to about 30 μm. It may also be coated with a subbing layer, if desired.

The dye-donor element of the invention may be used in sheet form or in a continuous roll or ribbon. been obtained with sublimable dyes. Examples of sublimable dyes include anthraquinone dyes, e.g., Sumikalon Violet RS ® (Sumitomo Chemical Co., Ltd.), Dianix Fast Voilet 3R-FS ® (Mitsubishi Chemcial Industries, Ltd.), and Kaylon Polyol Brilliant Blue N-BGM ® and KST Black 146 ® (Nippon Kayaku Co., Ltd.); azo dyes such as Kayalon Polyol Brilliant Blue BM ®, Kayalon Polyol Dark Blue 2BM ®, and KST Black KR ® (Nippon Kayaku Co., Ltd.), Sumickaron Diazo Black 5G ® (Sumitomo Chemcial Co., Ltd.), and Miktazol Black 5GH ® (Mitsui Toatsu Chemicals, Inc.); direct dyes such as Direct Dark Green B ® (Mitsubishi Chemcial Industries, Ltd.) and Direct Brown M ® and Direct Fast Black D ® (Nippon Kayaku Co. Ltd.); acid dyes such as Kayanol Milling Cyanine 5R ® (Nippon Kayaku Co. Ltd.); basic dyes such as Sumicacryl Blue 6G ® (Sumitomo Chemical co., Ltd.), and Aizen Malachite Green ® (Hodogaya Chemical Co., Ltd.);

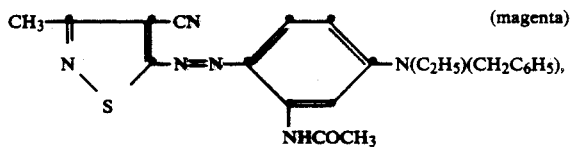

-continued

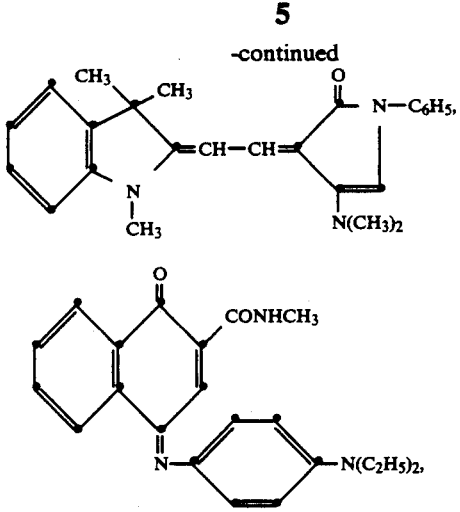

(yellow)

(cyan)

Various methods may be used to transfer dye from the dye-donor to the transparent support to form the color filter array element of the invention. There may be used, for example, a high intensity light flash technique with a dye-donor containing an energy absorptive material such as carbon black or a non-subliming light-absorbing dye. Such a donor may be used in conjunction with a mirror which has a grid pattern formed by etching with a photoresist material. This method is described more fully in U.S. application Ser. No. 408,581 by Simons entitled "Method of Making a Color Filter Array Using Light Flash", filed Sept. 18, 1989, now U.S. Pat. No. 4,923,860.

Another method of transferring dye from the dye-donor to the transparent support to form the color filter array element of the invention is to use a heated embossed roller as described more fully in U.S. application Ser. No. 408,580 by Simons entitled "Method of Making a Color Filter Array Using a Heated Embossed Surface", filed Sept. 18, 1989.

After the dyes are transferred to the receiver, the image may be treated to further diffuse the dye into the dye-receiving layer in order stabilize the image. This may be done by radiant heating, solvent vapor, or by contact with heated rollers. The fusing step aids in preventing fading and surface abrasion of the image upon exposure to light and also tends to prevent crystallization of the dyes. Solvent vapor fusing may also be used instead of thermal fusing.

The following examples are provided to illustrate the invention.

EXAMPLE 1 -PHOTOLYTICALLY HARDENED POLYMERIC BINDER

In this example, a patterned mirror was prepared in order to provide a means to transfer dye from a dye-donor in a repeating mosaic pattern to a receiver.

A patterned glass mirror was made by removing the lacquer from the back of a commercially-available glass silvered mirror by treating it with a mixture of dimethyl formamide and cyclohexanone (3:1) at 95° C. for 15 minutes. The revealed metal surface was then coated with a quantity of Kodak Micro Resist 747 ® photoresist and the excess poured off so as to leave a thin film. It was then dried, exposed through a mask of the desired pattern, developed for about two minutes in Kodak Micro Resist ® developer, rinsed for 15 seconds in Kodak Micro Resist ® rinse, and then etched in a solution of 400 g/l of $FeCl_3.6H_2O$ to remove areas of the mirrored surface to give an array of clear squares of 300 μm edge length. Each square touched the corner of the next square along one diagonal of the array, and was laterally separated from the adjacent clear squares along the orthogonal axes of the array by 600 μm.

Cyan, magenta and yellow dye-donors were prepared by coating on a 6 μm poly(ethylene terephthalate) support the following compositions made up with butanone solvent to give the stated coated laydowns.

Carbon Dispersion

The following composition was ball-milled for two days:

| | |
|---|---|
| Carbon Black (Regal 300 ® - Cabot Corp.) | 2.4 g |
| Ethyl cellulose | 0.9 g |
| Butanone | 60 ml |

Yellow Composition

| | |
|---|---|
| Yellow dye illustrated above | 0.25 g/m² |
| Carbon Black Dispersion | 0.76 g/m² |
| Cellulose acetate propionate | 0.38 g/m² |

Magenta Composition

| | |
|---|---|
| Magenta dye illustrated above | 0.20 g/m² |
| Carbon Black Dispersion | 0.58 g/m² |
| Cellulose acetate propionate | 0.30 g/m² |

Cyan Composition

| | |
|---|---|
| Cyan dye illustrated above | 0.39 g/m² |
| Carbon Black Dispersion | 1.17 g/m² |
| Cellulose acetate propionate | 0.58 g/m² |

A dye-receiver was prepared by applying to a glass plate a polymer which was capable of being cross-linked. Two examples were prepared, a control without a cross-linking agent and one with a chromium carbonyl agent which would cause cross-linking on irradiation with light.

Unhardened receiver

This was prepared by applying to the plate a 3% solution of methyl methacrylate/methacrylic acid copolymer (weight ratio 88:12) in 9:1 acetone:methanol. The excess was then poured off and allowed to dry, giving a dry film of about 3 μm thick.

Hardened receiver

This was prepared as above, but 0.1% of benzene chromium tricarbonyl was added to the polymer solution.

The yellow donor was placed on top of the dye-receiver face-to-face. The patterned glass mirror was placed on the poly(ethylene terephthalate) support of the donor element, the patterned surface of the mirror being in contact with the support. This assembly was placed in a vacuum frame with the vacuum frame cover sheet overlying the assembly. A vacuum was then applied to hold the assembly in close contact. The assembly was then exposed to a flash as described below. In the clear window areas of the mirror, the high-intensity light passed through to the dye-donor. The carbon in the dye-donor then converted the high-intensity light energy to thermal energy to selectively transfer the dye.

The 7.5×4.5 cm window of a Mecablitz ® Model 45 (Metz AG Company) was fitted with a mirror box 6 cm long to reduce the exit aperture to 4.5 cm×4.5 cm. The flash unit was placed with the window of the mirror box against the patterned glass mirror and the flash fired at full intensity. Upon separating the assembly, a yellow dye was seen to have transferred to the coated surface of the glass plate in a square array pattern corresponding to the clear areas of the mirror.

This process was repeated with the magenta and cyan dye-donors with the patterned glass mirror laterally shifted 300 μm each time. The dyes were then driven deeper into the receiving layer by an overall heating step using a hot metal plate maintained at 150° C. Microscopic examination showed the plate to bear an array of yellow, magenta and cyan square patches of approximately 300 μm edge length.

The process was repeated with the patterned mirror shifted to give superposition of two transferred dyes to produce each additive color of the mosaic pattern. Thus, green filter patches were observed where yellow and cyan squares had been superposed, blue where magenta and cyan squares had been superposed, and red where magenta and yellow squares had been superposed.

After transfer of the dyes to the receiving glass plates, they were heated at 170° C. for 30 minutes, and the filter patterns were examined microscopically.

The transferred dye filter pattern in the unhardened receiver was seen to have softened edges to the filter squares after the heating step, due to dye diffusion.

After dye transfer to the hardened receiver, the layer was photolytically cross-linked or hardened by exposing it to daylight, augmented by a 15 minute exposure to an 8-watt fluorescent ultraviolet lamp, held 10 cm distant. After the 170° C. heat treatment described above, the edges of the filter squares of the hardened receiver were seen to be significantly sharper than in the comparative unhardened example.

The hardening of the layer was confirmed by wiping the layer with a tissue soaked in methanol; the hardened layer was not removed by this process, whereas the unhardened layer was wiped off.

EXAMPLE 2 - THERMALLY-HARDENED POLYMERIC BINDER

The receiving layer in this example comprised a blend of Araldite GT6099 ® epoxy resin (supplied by Ciba-Geigy Plastics, Duxford, Cambridge, UK), (a solid bisphenol A epoxy resin of high hydroxyl content) and an isobutylated urea resin, BE678 (supplied by British Industrial Plastics Limited, Warley, West Midlands, UK). A trace of phosphoric acid was added as a catalyst. The layer was made up as follows:

The following solution was prepared:

| | |
|---|---|
| Araldite GT6099 (10% in butanone) | 1.0 ml |
| BE678 (10% solids in butanone) | 0.3 ml |
| Butanone | 0.5 ml |
| 0.1% polyphosphoric acid in butanone | 0.1 ml |

The solution was poured onto a glass plate, spread evenly, and then the surplus poured off. The resulting thin layer was allowed to dry, giving a clear, dry film of about 3 μm thick.

A magenta dye pattern was transferred to the receiving layer as in Example 1. The resulting pattern was heated in an oven at 140° C. for 30 minutes to diffuse the dye within the layer, and also to cross-link the receiving layer.

The pattern was then tested for thermal stability by heating for 30 minutes at 170° C. On examination, it was found that the dye pattern had remained intact, suffering only minor diffusion at the edges of the 300 μm square.

EXAMPLE 3 - THERMALLY HARDENED POLYMERIC BINDER

Example 2 was repeated but using the Araldite GT6099 ® epoxy resin and P2504 ® (Scado N.V , Netherlands) polyester resin made from terephthalic acid, neopentyl glycol and trimellitic anhydride in the following coating solution:

| | |
|---|---|
| Araldite GT6099 (10% in butanone) | 0.8 ml |
| BE678 (10% solids in butanone) | 0.4 ml |
| P2504 polyester (5% solution in butanone) | 1.2 ml |
| 0.1% polyphosphoric acid in butanone | 0.1 ml |

The results were similar to those of Example 2 with good retention of the filter pattern after 30 minutes at 170° C.

The invention has been described in detail with particular reference to preferred embodiments thereof, but it will be understood that variations and modifications can be effected within the spirit and scope of the invention.

What is claimed is:

1. A thermally-transferred color filter array element comprising a transparent support having thereon a thermally-transferred image comprising a repeating mosaic pattern of colorants in a cross-linked polymeric binder having a glass transition temperature $T_g$ greater than 150° C., said binder being cross-linked after transfer of said image.

2. The element of claim 1, wherein said thermally-transferred image comprises one or more sublimable dyes.

3. The element of claim 1, wherein said pattern consists of a set of red, green and blue additive primary colors.

4. The element of claim 3, wherein said primary colors are separated from each other by an opaque area.

5. The element of claim 4, wherein said opaque areas form a black grid.

6. The element of claim 1, wherein said support is glass.

7. A process of forming a color filter array element comprising the steps of:
 (a) imagewise-heating a dye-donor element comprising a support having thereon a dye layer;
 (b) transferring portions of said dye layer to a dye-receiving element comprising a transparent support having thereon a cross-linkable polymeric binder and a cross-linking agent;
 (c) said step of imagewise-heating being done in such a way to produce a repeating mosaic pattern of colorants; and
 (d) cross-linking said polymeric binder.

8. The process of claim 7, wherein the step of cross-linking is done by heating.

9. The process of claim 7, wherein the step of cross-linking is done by light exposure.

* * * * *